United States Patent
Zellmann et al.

(10) Patent No.: US 8,201,887 B2
(45) Date of Patent: Jun. 19, 2012

(54) FITTING

(75) Inventors: Michael Zellmann, Bischberg (DE);
Oliver Steffen, Coburg (DE); Frank Fassbender, Coburg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 12/882,749

(22) Filed: Sep. 15, 2010

(65) Prior Publication Data

US 2011/0062760 A1    Mar. 17, 2011

Related U.S. Application Data

(63) Continuation of application No. PCT/EP2009/000493, filed on Jan. 27, 2009.

(30) Foreign Application Priority Data

Mar. 15, 2008 (DE) .................. 20 2008 003 706 U

(51) Int. Cl.
*B60N 2/02* (2006.01)
*B60N 2/235* (2006.01)

(52) U.S. Cl. .................. 297/362; 297/367 R; 297/366

(58) Field of Classification Search .............. 297/362, 297/366, 367
See application file for complete search history.

(56) References Cited

U.S. PATENT DOCUMENTS

| 3,960,048 | A | | 6/1976 | Wagner |
| 4,278,290 | A | * | 7/1981 | Werner et al. .................. 297/362 |
| 4,299,100 | A | * | 11/1981 | Crisman et al. .............. 62/457.4 |
| 5,681,086 | A | | 10/1997 | Baloche |
| 2003/0067205 | A1 | * | 4/2003 | Eppert et al. ................ 297/463.1 |
| 2007/0214998 | A1 | * | 9/2007 | Komaki et al. ............... 105/396 |
| 2007/0289092 | A1 | | 12/2007 | Rohee et al. |
| 2008/0217980 | A1 | * | 9/2008 | Zou et al. ....................... 297/362 |

FOREIGN PATENT DOCUMENTS

| DE | 101 05 282 A1 | 8/2002 |
| DE | 20 2004 010 645 U1 | 10/2004 |
| DE | 10 2007 021 022 A1 | 12/2007 |
| EP | 0 720 930 A1 | 7/1996 |
| EP | 1 055 550 A2 | 11/2000 |
| EP | 1 676 502 A2 | 7/2006 |
| EP | 1 806 072 A1 | 7/2007 |
| JP | 2001-162388 | 6/2001 |

* cited by examiner

*Primary Examiner* — Sarah B McPartlin
(74) *Attorney, Agent, or Firm* — Muncy, Geissler, Olds & Lowe, PLLC

(57) ABSTRACT

A fitting is provided that has a first fitting part and a second fitting part that can be rotated about a rotation axis relative to the first fitting part, wherein both fitting parts are held rotatably to one another in the axial direction by means of a retaining ring. For this purpose, a retaining ring overlaps the second fitting part in the axial direction, and is firmly connected to the second fitting part at that location, and pretensions the first fitting part against the second fitting part by means of a stop that is tilted inward against the radial direction. Such a fitting can be produced in a particularly cost-effective manner.

20 Claims, 2 Drawing Sheets

FITTING

This nonprovisional application is a continuation of International Application No. PCT/EP2009/000493, which was filed on Jan. 27, 2009, and which claims priority to German Patent Application No. DE 20 2008 003 706.9, which was filed in Germany on Mar. 15, 2008, and which are both herein incorporated by reference.

BACKGROUND OF THE INVENTION

1. Field of the Invention

The invention relates to a fitting having a first fitting part and a second fitting part that can be rotated about a rotation axis relative to the first fitting part, whereby both fitting parts are held rotatably to one another in the axial direction by a retaining ring. A fitting of this type is suitable particularly for adjusting a back rest inclination in a vehicle seat.

2. Description of the Background Art

A fitting of the aforementioned type is disclosed, for example, in European Pat. Appl. No. EP 0 720 930 A1, which corresponds to U.S. Pat. No. 5,681,086. According to this prior art, a locking device arranged between the fitting parts is provided for locking and unlocking of the fitting parts to one another. The locking device comprises a number of locking bolts which are guided slidably on the first fitting part in the radial direction and can be moved between a lock position, in which a locking mechanism is formed with the second fitting part, and a release position. To actuate the fitting, the locking bolts can be moved from their respective lock position to the release position by means of a suitable actuating device. Next, the fitting parts are rotated to one another until a desired target position is reached, particularly by a then enabled inclination adjustment of the connected back rest. If the action of the actuating device is canceled, the locking bolts return to the lock position due to the mechanical pretension, so that both fitting parts are now locked again in the target position. The back rest inclination is shifted and locked.

According to EP 0 702 930 A1, a radial outwardly seated retaining ring is provided, which by means of radial inwardly bent edges holds the two fitting parts together in the axial direction.

To improve the manufacture of a fitting of this type, it is disclosed in German Pat. Appl. No. DE 101 05 282 B4, which corresponds to U.S. Publication No. 20030067205, to insert a fitting part into the retaining ring by means of a press fit. For a defined axial positioning, in this regard a shoulder is provided on the retaining ring up to which the fitting part is pressed in.

German Utility Pat. No. DE 20 2004 010 645 U1 also discloses a fitting of the aforementioned type, whereby during an improved production an adapter, fixed to the seat, is welded directly to the retaining ring or a fitting part. This prior art also discloses welding the retaining ring to the fitting part to which the adapter is connected.

A fitting is disclosed in Unexamined German Pat. Appl. No. DE 10 2007 021 022 A1, which corresponds to U.S. Publication No. 20070289092, whereby the retaining ring is welded to a fitting part via an axial boundary surface, and the other fitting part is held under radial tension.

SUMMARY OF THE INVENTION

It is therefore an object of the invention is to improve a fitting of the aforementioned type with respect to the manufacture thereof. A further object of the invention is to provide a simplified manufacturing process for a fitting of said type.

The first object is achieved according to the invention for a fitting, particularly for a vehicle seat, which has a first fitting part and a second fitting part that can be rotated about a rotation axis relative to the first fitting part, whereby both fitting parts are held rotatably to one another in the axial direction by means of a retaining ring, in that the retaining ring overlaps the second fitting part axially and is fixedly connected there to the second fitting part and pretensions the first fitting part against the second fitting part by means of a stop angled inward in the radial direction.

The invention in this respect is based on the fact that in a fitting according to the prior art, whereby a radial bent edge of the retaining ring surrounds a fitting part, the play of the surrounded fitting part is unsatisfactory per se. This is due, on the one part, to manufacturing-related tolerances and, on the other, to the process of bending of the angled edge, also called flanging. On the other hand, the play of the movable fitting part in prior-art fittings is defined geometrically in that a circumferential shoulder, against which the other fitting part is supported axially, is introduced into the retaining ring. The fitting part surrounded by the curved edge can move in this manner with play against the other fitting part. The present play is then reduced further, for example, by inserting a plastic ring between the curved edge and the corresponding fitting part. It is also prior in the art to stamp in defined dead centers in the bent ring or crimp ring by means of center punching in order to thereby reduce further the geometrically predetermined play and to give the fitting part a defined supporting surface.

In surprising manner, the invention now departs from this costly practice by providing a stop for the retaining ring, said stop which is angled inwards against the radial direction and pretensions the first fitting part against the second fitting part. In other words, the retaining ring is formed with an overextending edge or stop, which is bent inward beyond the radial direction in the direction of the fitting part to be retained. The present material elasticity of the retaining ring can be utilized hereby for creating a spring or retention force directed against the fitting part, as a result of which the fitting part is guided free from play in a defined manner between the angled stop and the other fitting part. The retaining force can be set in a defined manner controlled by force or the path depending on the difference angle of the stop between its rest position and the pretensioned position.

A constant axial play of the fitting part is always assured by the overextended stop. Independent of given part tolerances, a uniform pretension between the fitting parts can be achieved. Because the retaining ring overlaps the second fitting part axially, a simple attachment of the retaining ring to the second fitting part in the desired pretensioned position is made possible. This embodiment in particular enables an adjustable pretension, because it is possible to change the position of the retaining ring axially relative to the fitting parts. The retaining ring can be guided without obstruction in the axial direction over the second fitting part.

The indicated fitting compared with a prior-art fitting offers the further advantage of a substantially simplified manufacturing process. The related object is achieved according to the invention for a method for manufacturing a fitting with the indicated features in that the retaining ring is pushed onto both fitting parts in the axial direction until a desired end position is achieved, in which the stop of the retaining ring is adjacent to the first fitting part under axial tension, and in this end position the retaining ring is joined to the second fitting part.

The retaining ring is pushed over the first and second fitting part in a simple manner or the fitting parts are inserted in the retaining ring, and then with application of an elastic counter tension the overextended stop is pressed against the first fitting part or both fitting parts lying one on top of the other are pressed against the stop, and finally the retaining ring is fixedly connected in this pretensioned position to the second fitting part. This represents a substantial simplification compared with prior manufacturing methods.

The desired end position is hereby predefined by the wanted counterforce of the stop, said force acting on the first fitting part. This counterforce of the retaining ring, resulting from the material elasticity, increases the further the first fitting part is pushed against the stop up to the radial orientation thereof. In this respect, an end position with the desired counter tension can be achieved by the overextended stop particularly in that the retaining ring is moved in a path-controlled manner until a predefined position relative to the first fitting part is achieved.

Advantageously, the retaining ring is pushed in the axial direction in a force-controlled manner until a predefined counterforce is achieved. Naturally, the first fitting part or both fitting parts as well can be pushed together equivalently by this method in a force-controlled manner against the stop of the retaining ring. A defined pretension of the two fitting parts to one another can be achieved in this way independent of fabrication tolerances. The achievable pretension depends in particular on the materials used for the retaining ring. Thus, a low counterforce can be achieved with a softer material overall than with a harder material. The setting of the counterforce or pretension can be varied over a broad range by the material selection in this respect and be adapted to the application of the fitting.

As a result of the given geometry of an overextended stop, a maximum counterforce results in the case of a force-controlled movement of the first fitting part relative to the retaining ring in case that the stop is bent back from its overextension up to the radial direction. In this position, the stop and the bearing surface of the first fitting part are oriented approximately parallel. This increase in the counterforce to a maximum amount opens the possibility of a relatively simple calibration of the relative position between the first fitting part and the retaining ring. To achieve a desired end position, in this respect according to another preferred variant, the retaining ring is pushed in a force-controlled manner until a predefined maximum force is achieved and is then moved back in the reverse direction of motion to an end position. This end position can now in turn be predefined by a defined counterforce, so that the backward movement occurs in a force-controlled manner. Then again, as a result of the calibration the end position can also be defined by a predefined distance, up to which the retaining ring is moved back. In this way as well, during the manufacturing a defined counterforce is achieved by the stop and thereby a defined pretension between the fitting parts.

Further an increased crash resistance for the fitting results due to the overextended stop. Should the fitting be stressed particularly in the axial direction, the stop is bent back from its overextension at first in the radial direction. With further bending, the contact point between the stop and the fitting part migrates radially outwards, so that the effective lever arm shortens with increasing bending. As a result, the force to be applied for a further deformation increases, however. The fitting increasingly resists the initiated force.

The attachment of the defined pretensioned retaining ring to the second fitting part can occur essentially with use of different joining methods. Care must be taken, however, that the set pretension of the retaining ring against the first fitting part is not lost because of the employed joining method. In this respect, flanging of the retaining ring pushed over the second fitting part should more likely be eliminated. On the other hand, the pretensioned retaining ring can be advantageously welded onto the second fitting part. In principle, clinching, screwing together, or gluing is also conceivable.

In an embodiment, the retaining ring is laser welded in the end position to the second fitting part. A precise weld seam can be produced by means of this welding process, which has become more common. The retaining ring in particular can be laser welded to the second fitting part by means of a radial weld encircling the retaining ring at least in part. To this end, the laser beam is directed radially against the retaining ring and guided around the fitting or the fitting is turned about the rotation axis with the laser beam being stationary. In this regard, a penetration weld seam forms extending in the radial direction from the retaining ring into the second fitting part and encircling the fitting at least in sections.

In an alternative or in addition, the laser welding is carried out with the formation of a fillet weld at the edge of the retaining ring. Such a fillet weld allows greater radial tolerances between the retaining ring and the second fitting part. Moreover, it can transfer higher forces in comparison with a radial weld. Nevertheless, the creation of a fillet weld by means of laser welding involves the risk of through-welding, so that in the worst case the fitting parts are connected and the fitting is thereby not usable. The fillet weld can also be produced in this respect by means of conventional welding technology.

Tests have shown that it is sufficient to set the desired counterforces by the stop, if said stop is angled at an angle of less than 20° relative to the radial direction. A pretension for the fitting can then be set within an ideal range via an axial shifting of the first fitting part relative to the stop.

The stop of the retaining ring can be designed as such essentially in sections and distributed over the perimeter of the retaining ring. Thus, the stop can have, for example, the form of a number of angled peripheral sections. In an embodiment, the stop is formed, however, as a circumferential collar. In this respect, an additional punching process for the production of the retaining ring can be omitted. At the same time, the bearing surface for the first fitting part is well defined hereby.

In an embodiment, the retaining ring has a flat lateral surface encircling the two fitting parts at least in sections. Such a simple geometry can further reduce the manufacturing costs compared with prior-art fittings. A radial stage of the retaining ring, on which the second fitting part is supported, is no longer necessary for the retaining ring specified here. The desired pretension of the retaining parts to one another is achieved by the joining of the retaining ring, pushed over the fitting parts in the end position, to the second fitting part. The presetting of a play between the first and the second fitting part via a geometric designing of the retaining ring is completely unnecessary.

Advantageously, the surface, directed against the stop, of the first fitting part has a minimum flatness; in particular, the flatness lies within a tolerance dimension of less than 0.5 mm. A defined flatness is achieved when the defining surface does not penetrate two surfaces parallel thereto, which are arranged at the distance of the predefined tolerance dimension (here less than 0.5 mm). The provision of a minimum flatness-achieves a defined contact area of the stop relative to the first fitting part. In the case of a circumferential collar, a certain sealing function is achieved hereby between the stop and the first fitting part, as a result of which, for example, penetration of a dip paint between the two fitting parts is prevented during manufacture. If the retaining ring is secured against the second fitting part, for example, by means of a circumferential weld seam, the problem of a penetrating dip paint is completely eliminated.

Advantageously, a groove is introduced on the inner shoulder, formed into the stop, of the retaining ring. A groove of this type, also called an undercut, allows a defined setting of the spring force or counterforce acting via the stop on the first fitting part. The deeper the undercut is made, the smaller the opposing force in the first fitting part by the stop. Further, this type of groove offers the advantage that optionally present flashes at the corners of the first fitting part no longer need to be removed in a costly manner. The introduced groove offers sufficient room, without such a flash becoming an obstruction for the rotary movement of the first fitting part. The production costs are also reduced by the omission of a deflashing step.

The groove can be introduced with or without cutting. It has turned out that a reduction of the stop's wall thickness by the groove to a residual wall thickness between 0.4 and 1 mm is advantageous for setting the desired counterforce for the fitting.

So that the first fitting part can move within the retaining ring, the outside diameter of the first fitting part is reduced versus the inside diameter of the retaining ring. To enable easy sliding of the retaining ring over the second fitting part, further a joining gap is formed expediently between the second fitting part and the retaining ring. Depending on the envisaged joining method between the retaining ring and the second fitting part, the joining gap should be preferably within a range between 0.01 and 0.5 mm. A fillet weld created by means of welding between the edge of the retaining ring and the second fitting part easily tolerates such gap sizes.

In an embodiment, a locking device is provided for locking and unlocking the fitting parts relative to one another. Said locking device comprises, for example, a number of locking bolts guided slidably in the radial direction on the second fitting part, said bolts which form a locking mechanism with the first fitting part in a radially outward position. If the locking bolts are pulled radially inward, for example, by means of a slotted disc, then both fitting parts are unlocked and can be shifted against one another. In the shifted position, the fitting parts are then again locked in regard to one another by means of the locking bolt.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
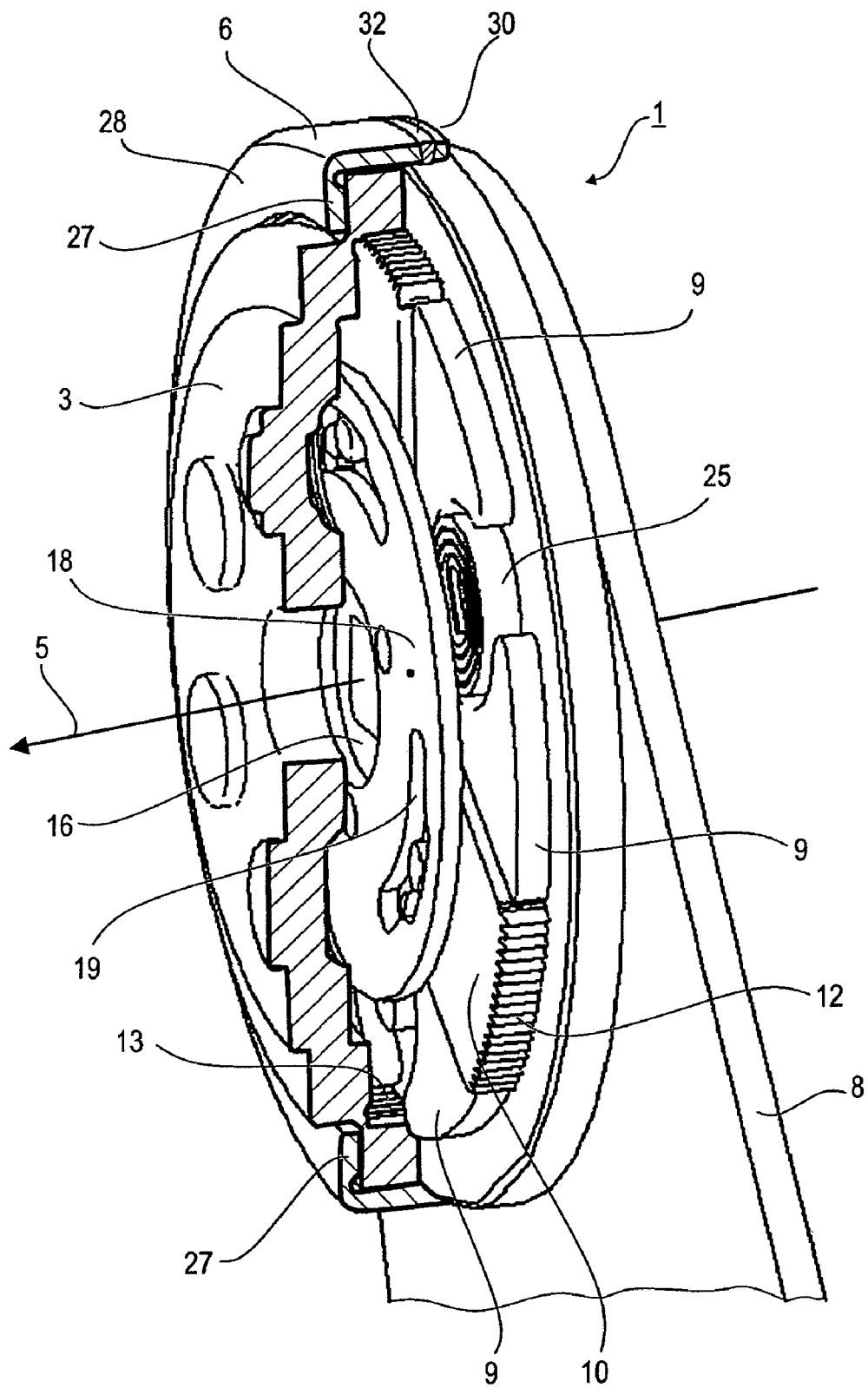
FIG. 1 shows in a partially cut open illustration a fitting with a retaining ring, which has a flat lateral surface.

A fitting 1 for adjusting the back rest of a vehicle seat relative to the seat base is shown in FIG. 1 in a partially cut open illustration. Fitting 1 comprises a first fitting part 3 and a second fitting part 4 relatively rotatable hereto. Both, substantially disc-shaped fitting parts 3, 4 are held to one another in the axial direction by a circumferential retaining ring 6. The rotation axis 5 defining a cylindrical coordinate system is evident around which both fitting parts 3, 4 are rotatable to one another. The first fitting part 3 is hereby connected to the back rest of the vehicle seat. The second fitting part 4 is connected rotationally fixed to an adapter plate 8, which is associated with the seat base.

In the interior of fitting 1 on the second fitting part 4 a series of guide elements 9 are visible, two of which in each case form a radial guide track for a locking bolt 10 disposed between them. The overall three locking bolts 10, mounted slidably in the radial direction, have on their radially outward end in each case a number of locking teeth 12, which in a locking position engage in each case in toothing 13 on an inner circumference of the first fitting part 3. In the outward locking position in each case of locking bolts 10, said bolts form a locking mechanism relative to the first fitting part 3, so that both fitting parts 3, 4 are locked against one another. Fitting 1 is thereby formed as a latch fitting.

To actuate fitting 1, an internal eccentric disc 16, acting against locking bolts 10, is provided, which is connected rotationally fixed to a slotted disc 18. If eccentric disc 16 is turned in the intended actuating direction by means of an actuating element (not shown), its action against locking bolts 10 no longer applies and slotted disc 18 by means of corresponding guide slots 19 pulls the locking bolts 10 radially inward in each case by means of pins 21 disposed thereon. The locking mechanism between the locking bolts 10 and the first fitting part 3 is released thereby. Fitting parts 3, 4 can be rotated freely against one another. After the effect on eccentric disc 16 is removed, said disc is again directed against the locking bolts 10 by means of spring elements 25, whereby said bolts again return to their radially outward locking position. Fitting 1 is locked in the adjusted position.

Retaining ring 6 retaining both fitting parts 3, 4 in the axial direction (along the rotation axis 5) has a stop 27, which is directed against the first fitting part 3 and is angled inward against the radial direction. Stop 27 is made in this case as a circumferential collar 28. To produce fitting 1, fitting parts 3, 4 are guided against stop 27 in a force-controlled manner until a desired counterforce is achieved. In the end position, defined by the counterforce, of the components relative to each other, retaining ring 6 is joined with the second fitting part 4. A laser welding is carried out as the joining method. A penetration weld seam 32 resulting herefrom is evident in FIG. 1, which extends radially inward and connects the flat outer casing of retaining ring 6 fixedly with the second fitting part 4.

Retaining ring 6 is made structurally simple. It only has a flat lateral surface and the collar 28 angled hereto. Collar 28 in this regard is angled inward against the radial direction, i.e., in the direction toward the first fitting part 3. After the joining of retaining ring 6 to the second fitting part 4, fitting parts 3, 4 are held together with a defined pretension by means of the angled collar 28. The first fitting part 3 can be rotated free from play with respect to the second fitting part 4. To this end, there is a radial gap opposite to the first fitting part 3 and the flat outer casing of retaining ring 6. To enable pushing of retaining ring 6 over fitting parts 3, 4 during manufacture, the inside diameter of the outer casing of retaining ring 6 is increased slightly compared with the outside diameter of the second fitting part 4.

Figure 2:
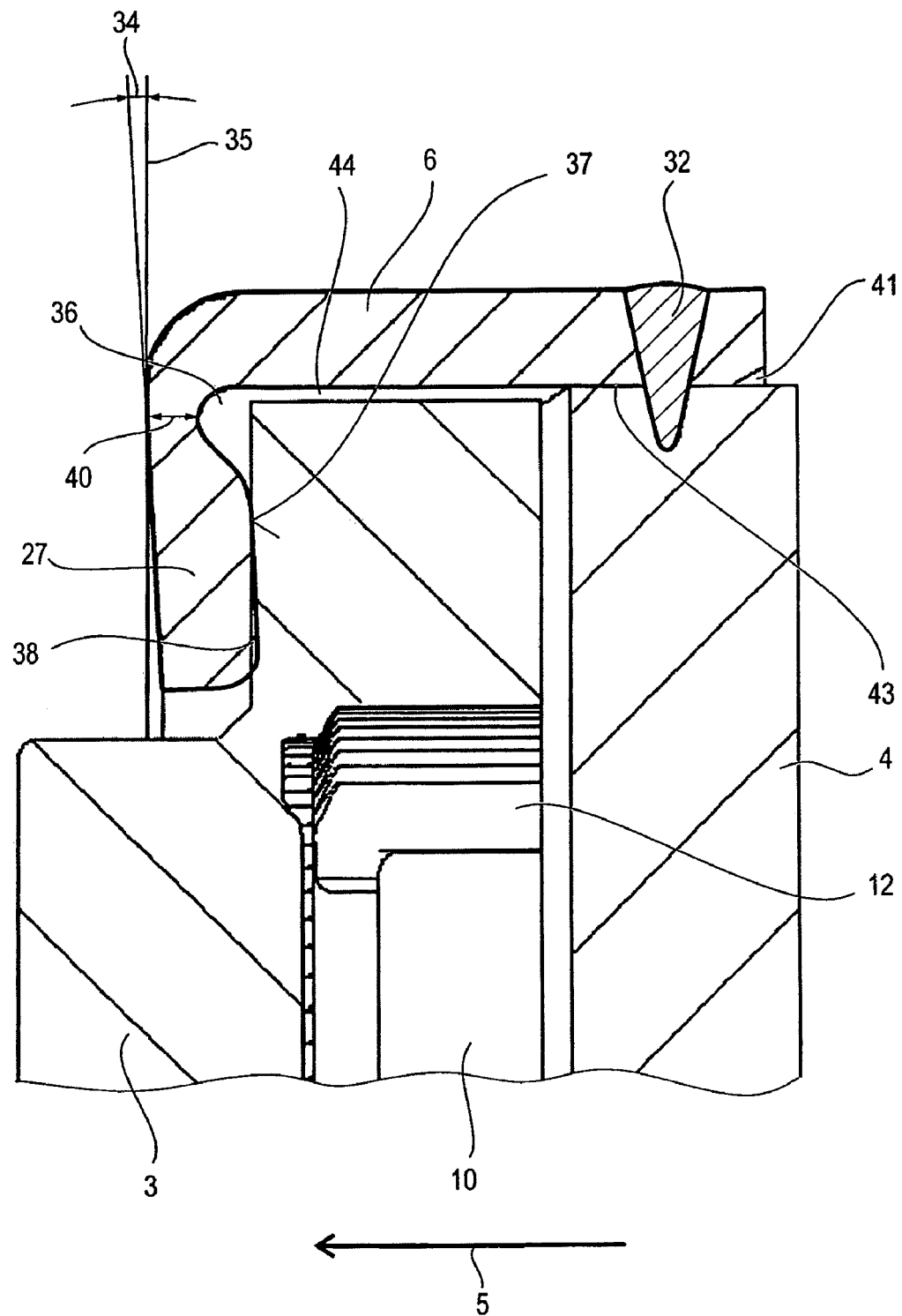
FIG. 2 shows in a cross section a partial aspect of a stop.

In FIG. 2 in a partially cut illustration a partial aspect of fitting 1 according to FIG. 1 is shown enlarged. Fitting parts 3 and 4 are again evident, which are held to one another by means of retaining ring 6 in the axial direction (along rotation axis 5).

In this respect, retaining ring 6 has a flat lateral surface, against which a stop 27 is angled in an overextending manner. Angle 34 of stop 27 in the shown pretensioned state is about 3° to the radial direction. To set defined spring elasticities, a groove 36 is introduced on the inner shoulder of retaining ring 6 to stop 27, said groove which reduces the material of stop 27 to a residual wall thickness 40 of about 0.8 mm, and thereby makes possible a desired counterforce of stop 27 against fitting part 3. Groove 36, moreover, allows that deflashing of the first fitting part 3 can occur at the edge thereof.

The overextension of stop 27 relative to the radial direction 35 produces a defined contact point 38 between stop 27 and bearing surface 37 of the first fitting part 3. As a result of the counterforce by the overextended stop 27, the first fitting part 3 experiences a defined pretension relative to the second fitting part 4. The first fitting part 3 can be rotated with a defined pretension free from play in retaining ring 6 and relative to the second fitting part 4.

In the pretensioned position, retaining ring 6, as already described, is joined to the second fitting part 4 by means of laser welding. The penetration weld seam 32 from FIG. 1 is clearly visible, which is produced by means of laser welding. As an alternative hereto, a circumferential fillet weld 41 can be produced between the edge of retaining ring 6 and the second fitting part 4 by means of laser welding or a conventional welding method. Such a fillet weld 41 allows greater radial tolerances between retaining ring 6 and the second fitting part 4. In addition, higher forces can be transmitted.

To be able to push retaining ring 6 easily over the second fitting part 4 during manufacture, a joining gap 43 is provided between retaining ring 6 and the second fitting part 4. In the case of joining by means of a fillet weld 41, this joining gap can have a dimension up to 0.5 mm.

The radial gap 44, necessary for the movement of the first fitting part 3 in retaining ring 6, relative to retaining ring 6 is also evident.

Further, a locking bolt 10 is evident in FIG. 2, which in its locking position by means of toothing forms a locking mechanism with the first fitting part 3. The locking teeth 12 of locking bolt 10 are evident in this case.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fitting for a vehicle seat, the fitting comprising:
a first fitting part;
a second fitting part configured to be rotated about a rotation axis relative to the first fitting part, the first and second fitting parts being held rotatably to one another in an axial direction via a retaining ring,
wherein the retaining ring overlaps the second fitting part axially and is fixedly connected to the second fitting part and pretensions the first fitting part against the second fitting part via an elastic stop angled inward against an axial direction with a deflection relative to a radial direction.

2. The fitting according to claim 1, wherein the stop of the retaining ring is angled at an angle of less than 20° relative to the radial direction.

3. The fitting according to claim 1, wherein the stop is a circumferential collar.

4. The fitting according to claim 1, wherein the retaining ring has a flat lateral surface encircling the first and second fitting parts, at least in sections.

5. The fitting according to claim 1, wherein a surface of the first fitting part directed against the stop has a flatness in a contact point area that lies within a tolerance dimension of less than 0.5 mm.

6. The fitting according to claim 1, wherein a groove is introduced on an inner shoulder formed into the stop of the retaining ring.

7. The fitting according to claim 6, wherein the groove reduces a wall thickness of the stop to a residual wall thickness between 0.4 and 1 mm.

8. The fitting according to claim 1, wherein a joining gap is formed between the second fitting part and the retaining ring.

9. The fitting according to claim 8, wherein the joining gap is between 0.01 and 0.5 mm.

10. The fitting according to claim 1, wherein the retaining ring is connected to the second fitting part via a weld seam.

11. The fitting according to claim 10, wherein the weld seam is made as a penetration weld seam encircling the retaining ring at least in sections.

12. The fitting according to claim 1, wherein a locking device is provided for locking and unlocking the first and second fitting parts relative to one another.

13. A method for producing a fitting according to claim 1, wherein the retaining ring is pushed onto the first and second fitting parts in the axial direction until a desired end position is achieved in which the stop of the retaining ring is adjacent to the first fitting part under axial tension, and in this end position the retaining ring is joined to the second fitting part.

14. The method according to claim 13, wherein the retaining ring is pushed in the axial direction in a force-controlled manner until a predefined counterforce is achieved.

15. The method according to claim 13, wherein the retaining ring is pushed in a force-controlled manner until a predefined maximum force is achieved and is then moved back in the reverse direction of motion in a force-controlled manner until a predefined counterforce is achieved.

16. The method according to claim 13, wherein the retaining ring is pushed in a force-controlled manner until a predefined maximum force is achieved and then moved back in a reverse direction of movement for a predefined distance to the end position.

17. The method according to claim 13, wherein the retaining ring is laser welded in the end position to the second fitting part.

18. The method according to claim 17, wherein the laser welding is carried out with the formation of a penetration weld seam at least partially encircling the retaining ring.

19. The fitting according to claim 1, wherein the stop of the retaining ring contacts a surface of the first fitting part at an angle.

20. The fitting according to claim 1, wherein the stop of the retaining ring is sufficiently elastic to bend by a difference angle of at least 1° between a rest position and a pretensioned position.

* * * * *